(No Model.)
J. F. BANKS.
MILK COOLER.
No. 449,992. Patented Apr. 7, 1891.
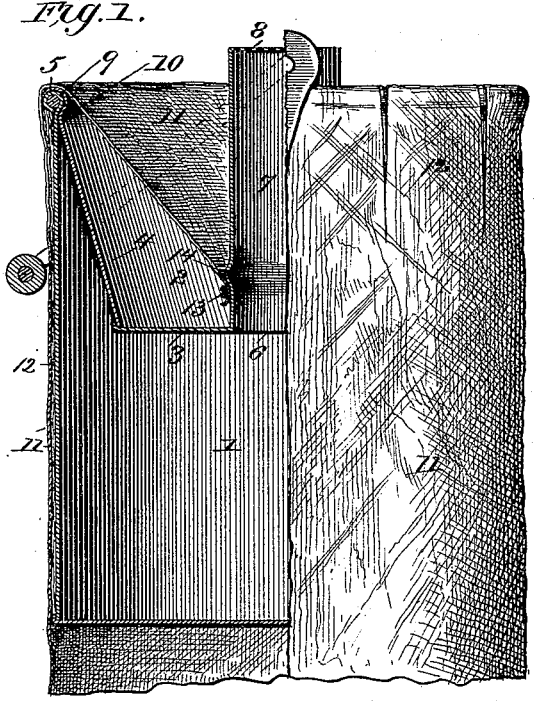
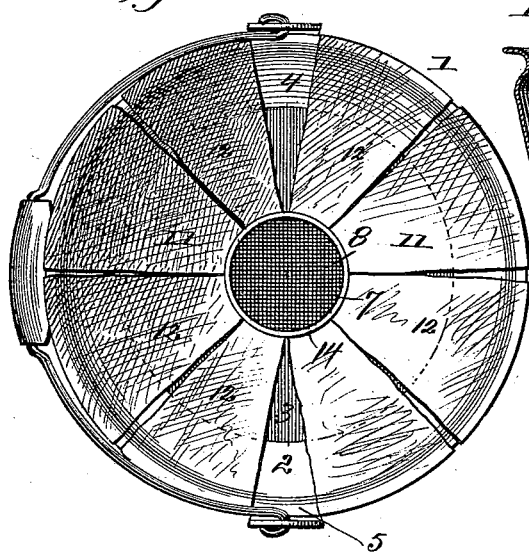
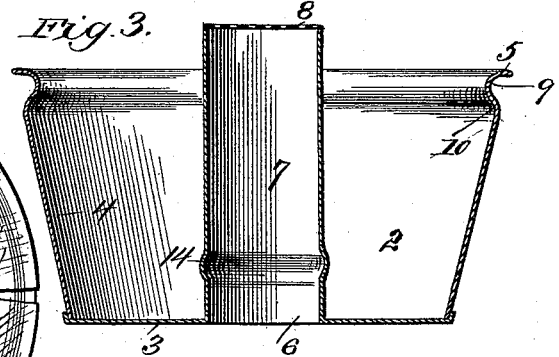
WITNESSES:
Fred G. Dieterich
Jos. A. Ryan
INVENTOR:
John F. Banks
BY Munn & Co.
ATTORNEYS.

UNITED STATES PATENT OFFICE.

JOHN F. BANKS, OF BLUFFTON, TEXAS.

MILK-COOLER.

SPECIFICATION forming part of Letters Patent No. 449,992, dated April 7, 1891.

Application filed November 6, 1889. Serial No. 329,389. (No model.)

*To all whom it may concern:*

Be it known that I, JOHN F. BANKS, of Bluffton, in the county of Llano and State of Texas, have invented a new and useful Improvement in Milk-Coolers, of which the following is a specification.

My invention is an improvement in that particular class of milk-coolers in which water is drawn by capillary attraction from a receptacle placed above the milk-receptacle onto a cloth wrapped around the latter, thus cooling the milk by evaporation.

In my invention the water-receptacle is adapted to fit into milk-receptacles of various sizes, and the cloth by which the water is drawn off is removably secured around a central vertical tube forming a permanent attachment of said water-receptacle, all as hereinafter more fully described.

Referring to the accompanying drawings, Figure 1 is a side elevation, partly in section, of my improved milk-cooler. Fig. 2 is a top view of the same, and Fig. 3 is a detail section.

The same numerals of reference indicate corresponding parts in all the figures.

Referring to the several parts by their designating numerals, 1 indicates a plain tin bucket of the ordinary construction and of sufficient size. In this bucket is placed the milk or other fluid to be cooled.

In the open upper end of the bucket 1 I fit my new and improved top 2, having the bottom 3 and the deep sides 4. This top 2 fits down in the mouth or top of the bucket, and is formed at its upper edge with an outwardly-projecting flange 5, which projects out over the upper rim of the bucket and is made sufficiently large and wide to prevent the water which is drawn from the top 2 down over the sides of the bucket 1 from entering the top of the bucket. The sides of the top or water-receptacle 2 are inclined outward from the bottom upward, by which construction the top is adapted to fit more than one bucket and can be used on buckets of different size or diameter. The bottom 3 is formed with a central opening 6, in which fits and is secured the lower end of a tube 7, which extends up about one-half inch above the top of the part 2 and has secured over its upper end a wire-gauze 8. The top 2 is preferably formed at its upper end just below its flange 5 with the annular grooves 9 10, one on its inner and one on its outer side, by which arrangement, when the top fits down snugly in a bucket, with the flange 5 resting on the upper edge of the bucket, the rounded upper edge of the bucket will be caught in the outer groove 9, closing the top of the bucket air-tight at its edge and bringing the flange 5 of the top closely down upon the bucket-rim.

11 11 indicate two wide pieces or strips of any suitable kind of cloth, although I preferably employ canton-flannel, which should be boiled before using. The upper end of each piece is cut longitudinally to form a series of separate points or wicks 12, usually four in number. The free ends of these wicks are strung removably on a cord 13. The cords 13 are tied from opposite sides around the tube 7 beneath an annular projection 14, formed on the tube near its lower end, and the cloths 11 11 are of such length that when the top 2 is placed in the upper end of the bucket the lower ends of the cloth will hang a foot or more below the bottom of the bucket. The bucket being filled to the proper height with milk and the top placed in position, the edges of the cloths 11 are pinned together, thus drawing the cloths close around the bucket, and the top 2 is filled with water. The strips or wicks 12, forming the upper end of the cloths, will absorb and draw up the water over the upper flanged edge of the top 2, and the cloths 11, inclosing the bucket, will be kept continually wet by capillary attraction. It will thus be seen that when the bucket is suspended in a cool place, hung under a tree, or even placed in the sun, the absorption of the water will keep the milk perfectly cool, while the animal gases from the milk rise up the tube 7 and escape through the wire-gauze 8 at its upper end.

It will be seen that my milk-cooler is very simple and cheap in construction, that it can be fitted instantly to any plain ordinary bucket, and will transform a common bucket into a perfect milk-cooler. Furthermore, the amount of water drawn from the top 2 and fed down the sides of the bucket can be regulated accurately and very readily by drawing one, two, or more of the points 12 from their cord 13 and lifting them out of the water. It will thus be seen that only enough of the points 12 can be fastened in the water to carry as much water down the sides of the bucket as will be evaporated, this amount varying according to the state of the weather.

My cooler is very easily kept clean, and there is practically no waste of water. When the top 2 is to be removed, the side edges of the cloths are unpinned and the cloths placed in the top 2, when the top is lifted out of the bucket by the central tube 7. The top only requires filling with water about twice a day, and will keep milk for twenty-four hours.

Having thus described my invention, what I claim, and desire to secure by Letters Patent, is—

1. In a milk-cooler, the combination, with an open-topped milk-bucket 1, of the water-receptacle 2, having inclined sides, and the central vertical tube 7 of the cloth 11, whose upper end is removably secured around said tube, as shown and described.

2. In a milk-cooler, the combination of the cloth 11 with the water-receptacle or top 2, having the central vertical tube 7, said cloth being removably attached to the tube, as shown and described, for the purpose specified.

3. In a milk-cooler, the combination of the cloth 11, having the cord 13 applied to its upper end, with the water-receptacle or top 2 and its central vertical tube 7, having the annular shoulder near its lower end, all as shown and described, whereby the cloth may be removably secured to the tube and held beneath the surface of the water contained in said receptacle, as specified.

4. In a milk-cooler, the combination of a bucket 1, the top or water-receptacle having the inclined sides, the upper edge flange, the central opening, and the central tube having the wire-gauze at its upper end, and the cloths 11, formed at their upper ends with the series of separate tongues or points 12, and the securing-cords 13, on which the free ends of the tongues 12 are removably secured, substantially as set forth.

JOHN F. BANKS.

Witnesses:
J. B. MARTIN,
A. J. BALLARD.